United States Patent [19]

Pilhall

[11] 4,078,827

[45] Mar. 14, 1978

[54] TOWING DEVICE FOR MOTOR VEHICLES

[75] Inventor: Stig Tore Lennart Pilhall, Trollhattan, Sweden

[73] Assignee: AB Volvo, Goteborg, Sweden

[21] Appl. No.: 683,031

[22] Filed: May 4, 1976

[30] Foreign Application Priority Data

May 6, 1975 Sweden .............................. 7505234

[51] Int. Cl.² .............................................. B60D 1/06
[52] U.S. Cl. ................ 280/491 B; 280/500; 293/69 R
[58] Field of Search ........... 280/491 B, 491 R, 491 D, 280/491 E, 498, 500, 495; 293/69 R, 71 R, 71 P

[56] References Cited

U.S. PATENT DOCUMENTS 2,823,930  2/1958  Cooper .............................. 280/491 B
2,889,155  6/1959  Sandage .............................. 280/495

*Primary Examiner*—Philip Goodman
*Assistant Examiner*—John A. Pekar
*Attorney, Agent, or Firm*—Young & Thompson

[57] ABSTRACT

Towing device for motor vehicles, preferably passenger cars, comprising a towing bar, one end of which has an upwardly directed portion in the form of a ball and the other end of which has an attachment portion anchored in the vehicle. The attachment portion is formed of an axle rotatably journalled on the vehicle, which axle is arranged with inclination in relation to a vertical plane on the longitudinal axis of the vehicle in order to allow the towing bar to swing, without hindrance from a bumper located in front of the ball, from a rear-directed towing position to a side-directed position under said bumper.

5 Claims, 2 Drawing Figures

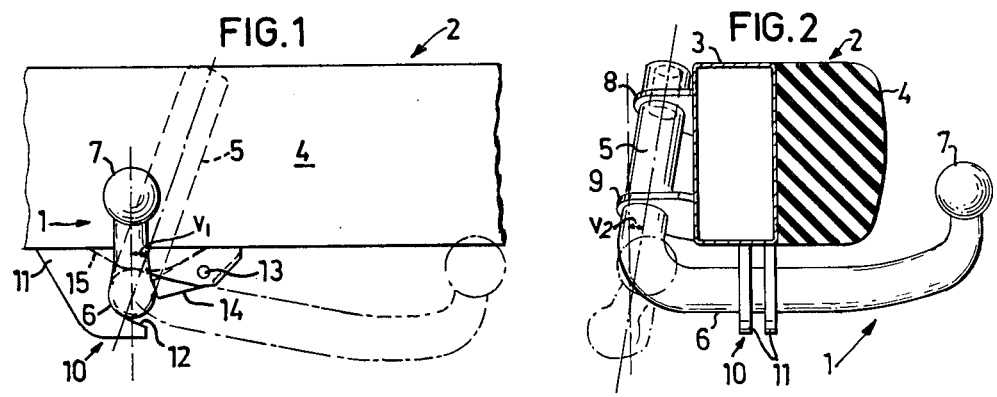

TOWING DEVICE FOR MOTOR VEHICLES

The present device relates to a towing device for motor vehicles, preferably passenger cars, comprising a towing bar, one end of which has an upwardly directed portion shaped as a ball and the other end of which has an attachment portion anchored to the vehicle.

Practically all passenger cars with towing devices of this type have the towing device rigidly mounted in such a manner that the outer portion of the towing bar with the ball permanently extends back behind the car's rear bumper. In today's cars which are equipped with increasingly effective bumpers with the capacity in many cases to withstand a barrier crash at 8 km/h or more without damage, this means that the effect of the soft energy-absorbing bumper will be lost in many cases, since the steel ball when it is not being used would remain as a battering ram outside the bumper.

It is known to arrange removable towing devices, thereby avoiding the above mentioned disadvantaged. The disadvantage of this solution however is that a heavy dirty part must be taken off and laid, for example, in the trunk, when it is not being used. Assembly and disassembly require manipulation of fastening means, such as bolts, cotter pins and the like. Furthermore, because of the human factor there is always the risk that the anchoring means might not be mounted correctly with the resulting risk that the towing means not be secured and could therefore release while driving. For these reasons, among others, removable towing devices have not had any extensive practical use.

There have also been attempts to make towing devices with a towing ball which can be pushed in under the bumper. Because of their construction they are difficult to handle and their relatively long powerful towing bars can easily damage the fuel tank in a rear end collision.

The purpose of the present invention is to achieve a safe towing device whose ball can easily and without the help of tools, and without the necessity of handling anchoring parts, be placed in a position in front of the bumper.

This is achieved according to the invention by the anchoring portion consisting of an axle rotatably journalled on the vehicle which is inclined in relation to a vertical plane on the longitudinal axis of the vehicle so as to allow the towing bar to swing without hindrance from a bumper situated in front of the ball, from a rear-directed towing position to a side-directed position under said bumper.

Due to the fact that the towing device swings only a limited distance, preferably about 90°, and is never completely removed, the risk is minimal that the towed object will come loose, even if the towing bar were improperly locked by a locking device cooperating with the towing bar in the towing position. When the towing bar is swung in from the towing position the inclination of its axle is such that the ball passes freely under the lower edge of the bumper, in spite of the fact that the upper surface of the ball in the towing position is approximately even with the center line of the bumper.

In a further development of the towing device according to the invention, the axle is also disposed with an inclination in relation to a vertical plane transverse of the vehicle. This enables the towing bar and the ball in its folded in position to lie as high up against the bumper as possible. Thus, the ground clearance is minimally affected.

If the rear bumper of the vehicle is constructed in the form of a solidly mounted heavy bar or beam with an energy-absorbing soft portion, it is especially advantageous to journal the axle in brackets on the front side of the bumper, e.g. on the bar. Thus, the energy absorbing soft position does not need to be separated or otherwise adjusted to the towing device.

The invention will be described in more detail here with reference to an embodiment shown in the accompanying drawing, where FIG. 1 shows a rear view of an energy-absorbing bumper with a towing device according to the invention in towing position and FIG. 2 shows a cross section through the bumper in FIG. 1 with the towing device in the same position.

The towing device generally designated 1 is, in the example, mounted on an energy absorbing bumper 2, consisting of a heavy box girder 3 rigidly anchored to the vehicle, with an energy-absorbing portion 4 of flexible material.

The towing device 1 consists of an axle 5, a towing bar 6 and a ball 7, which are constructed as one piece. The axle 5 is rotatably journalled in brackets 8 and 9, which are welded fast to the front side of the beam 3. The towing bar 6 is locked in the position shown by a locking device 10 which is formed of two adjacent plates 11 welded fast to the underside of the beam 3 with openings 12, and a latch 14 swingably journalled on a pin 13, which is held in the position shown in FIG. 1 by the force of gravity and a spring 15.

As is evident from FIG. 1, the axle 5 is inclined at an angle $v_1$ in relation to a vertical plane along the longitudinal axis of the car. Furthermore, the axle 5 is inclined at an angle $v_2$ in relation to a vertical plane on the car's transverse axis, as is evident from FIG. 2. Because of this positioning of the axle, when the latch 14 is moved aside and the towing bar 6 is swung about 90° from the position shown with solid lines to the position shown with dash-dot lines, the ball 7 can "duck under" the bumper 2 and then again assume a relatively high end position.

In the folded-in position the towing bar 6 can be gripped and held by means not shown, such as a spring or the like. To fold out the bar it is necessary only to grasp the ball 7 or the bar 6 and swing the latter into the openings 12, whereafter it is automatically locked by the latch 14. If double security is desired, an extra lock for the latch 14 can be used. Furthermore, a screw can be arranged to tighten the latch to completely eliminate any play.

The invention is of course not limited to the embodiment described above with the axle 5 journalled on a beam of an energy-absorbing bumper but can also be used with advantage in vehicles with conventional bumpers, with the axle journalled to anchoring means connected to the vehicle in front of the bumper.

What I claim is:

1. Towing device for motor vehicles having a longitudinal axis, comprising a towing bar having an end portion in the form of a ball extending upwardly from one end of an elongated intermediate portion, which has a rear-directed towing position in which it extends substantially horizontally, and an attachment portion in the form of an axle extending upwardly from the other end of said intermediate portion and being rotatably journalled in means mounted on the vehicle in front of the rear edge of a rear bumper that has a rear edge, in order to allow said towing bar to swing sideways from said rear-directed towing position, said axle being inclined at an acute angle to a vertical plane on the longitudinal axis of the vehicle in order to provide vertical displacement of said ball during swinging movement of said towing bar, whereby said towing bar can be swung to a position under said bumper, in which it lies in a vertical plane substantially parallel with said bumper, said ball being higher than the lower edge of the bumper in said towing position and lower than said lower edge in said position under the bumper.

2. Towing device according to claim 1, wherein the axle is also inclined at an acute angle downwardly and forwardly in relation to a vertical plane transverse to said longitudinal axis of the vehicle.

3. Towing device according to claim 1, wherein locking means are provided for locking said towing bar in its rear-directed position, said locking means comprising a latch mounted on the vehicle for engagement with the intermediate portion of the towing bar.

4. Towing device according to claim 1, wherein the means in which the axle is journalled comprises brackets attached to the front side of said rear bumper.

5. Towing device according to claim 1, wherein the towing bar has a circular cross section and is formed as one piece with the axle.

* * * * *